(12) United States Patent
Toy

(10) Patent No.: US 11,561,816 B2
(45) Date of Patent: *Jan. 24, 2023

(54) ELASTIC CONTAINER PLATFORM ARCHITECTURE

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/069,269

(22) Filed: Oct. 13, 2020

(65) Prior Publication Data

US 2021/0026680 A1    Jan. 28, 2021

Related U.S. Application Data

(63) Continuation of application No. 16/266,805, filed on Feb. 4, 2019, now Pat. No. 10,838,759.

(51) Int. Cl.
*G06F 9/455* (2018.01)
*G06F 9/50* (2006.01)
*H04L 41/0816* (2022.01)
*G06F 9/54* (2006.01)
*G06F 9/48* (2006.01)

(52) U.S. Cl.
CPC ........ *G06F 9/45558* (2013.01); *G06F 9/4881* (2013.01); *G06F 9/5044* (2013.01); *G06F 9/545* (2013.01); *H04L 41/0816* (2013.01); *G06F 2009/45587* (2013.01); *G06F 2009/45591* (2013.01); *G06F 2209/5022* (2013.01)

(58) Field of Classification Search
CPC .... G06F 9/45558; G06F 9/4881; G06F 9/545; G06F 9/5044; G06F 2009/45587; G06F 2009/45591; G06F 2209/5022; H04L 41/0816
See application file for complete search history.

(56) References Cited

U.S. PATENT DOCUMENTS

| | | |
|---|---|---|
| 2013/0227563 A1 | 8/2013 | Mcgrath |
| 2017/0093790 A1 | 3/2017 | Banerjee et al. |
| 2017/0220389 A1* | 8/2017 | Michael .......... H04L 67/10 |
| 2018/0373505 A1 | 12/2018 | Engquist et al. |
| 2020/0210150 A1 | 7/2020 | Creti et al. |

* cited by examiner

*Primary Examiner* — Sisley N Kim

(57) ABSTRACT

A method, a device, and a non-transitory storage medium are described in which an elastic platform virtualization service is provided in relation to a virtual device. The elastic platform virtualization service includes logic that provides for the management of a virtualized device during its life cycle. The creation or reconfiguration of the virtualized device is based on a tertiary choice between using dedicated hardware and dedicated kernel; common hardware and common kernel; or a combination of the dedicated hardware, dedicated kernel, common hardware, and common kernel.

20 Claims, 16 Drawing Sheets

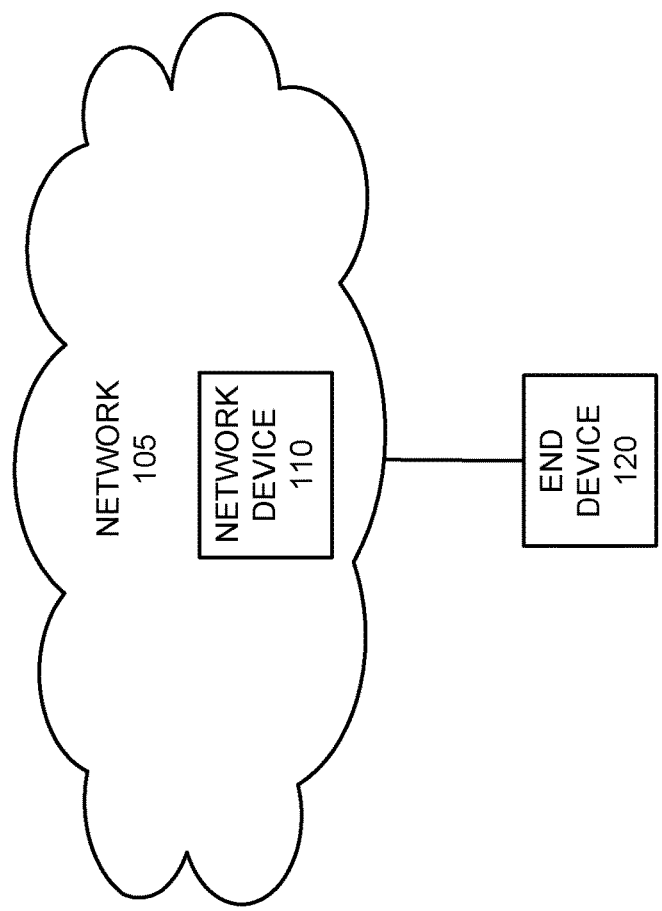

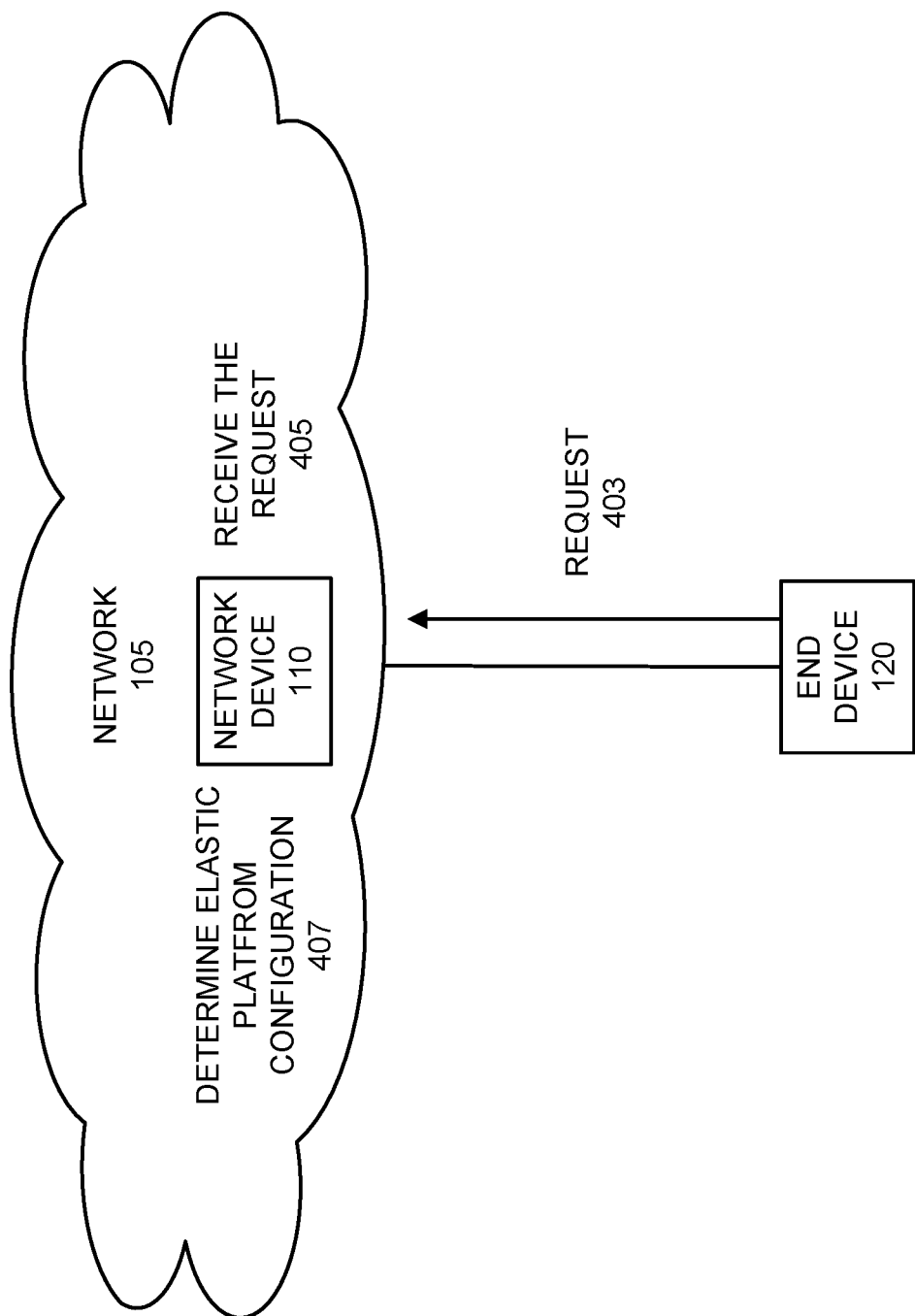

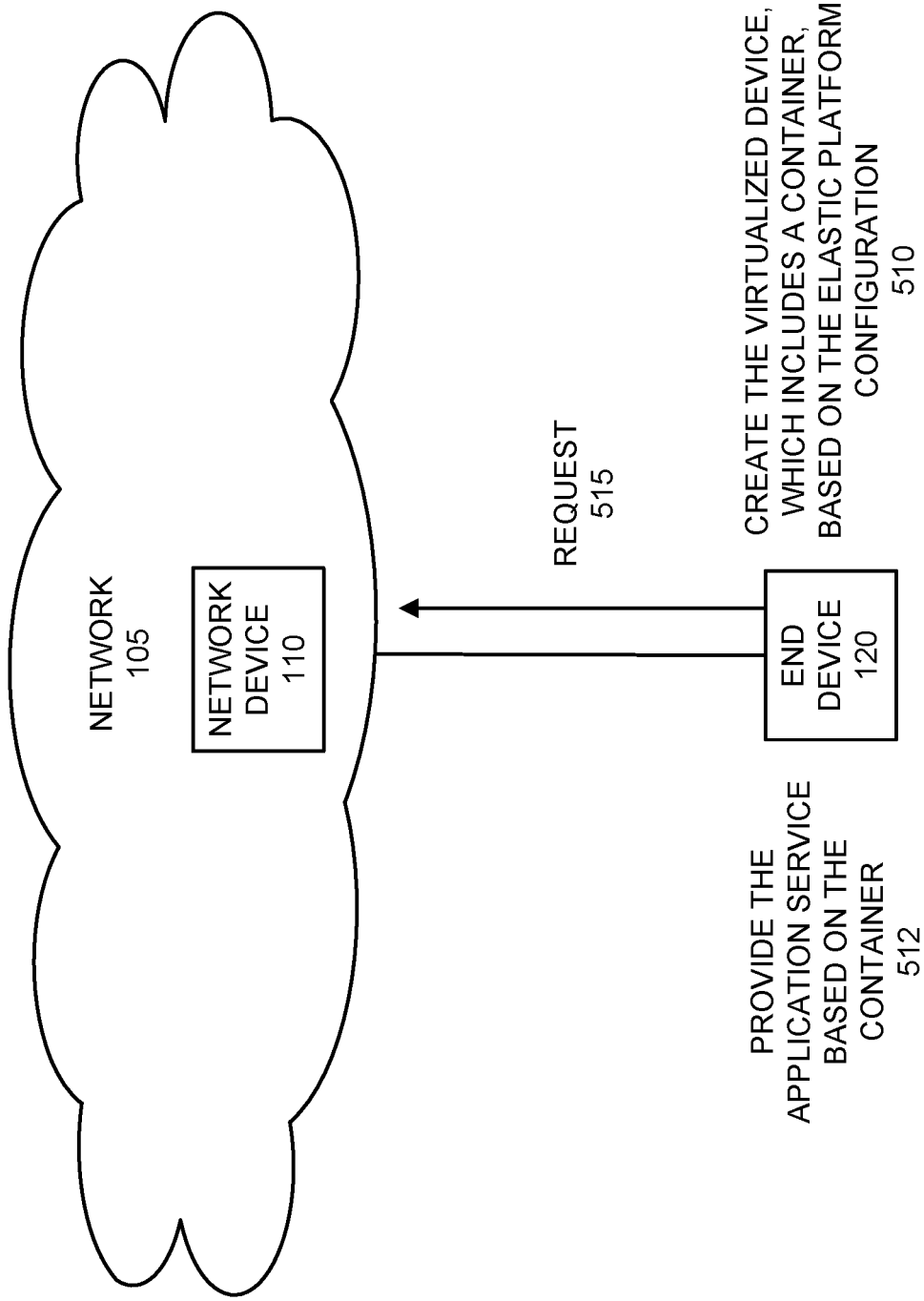

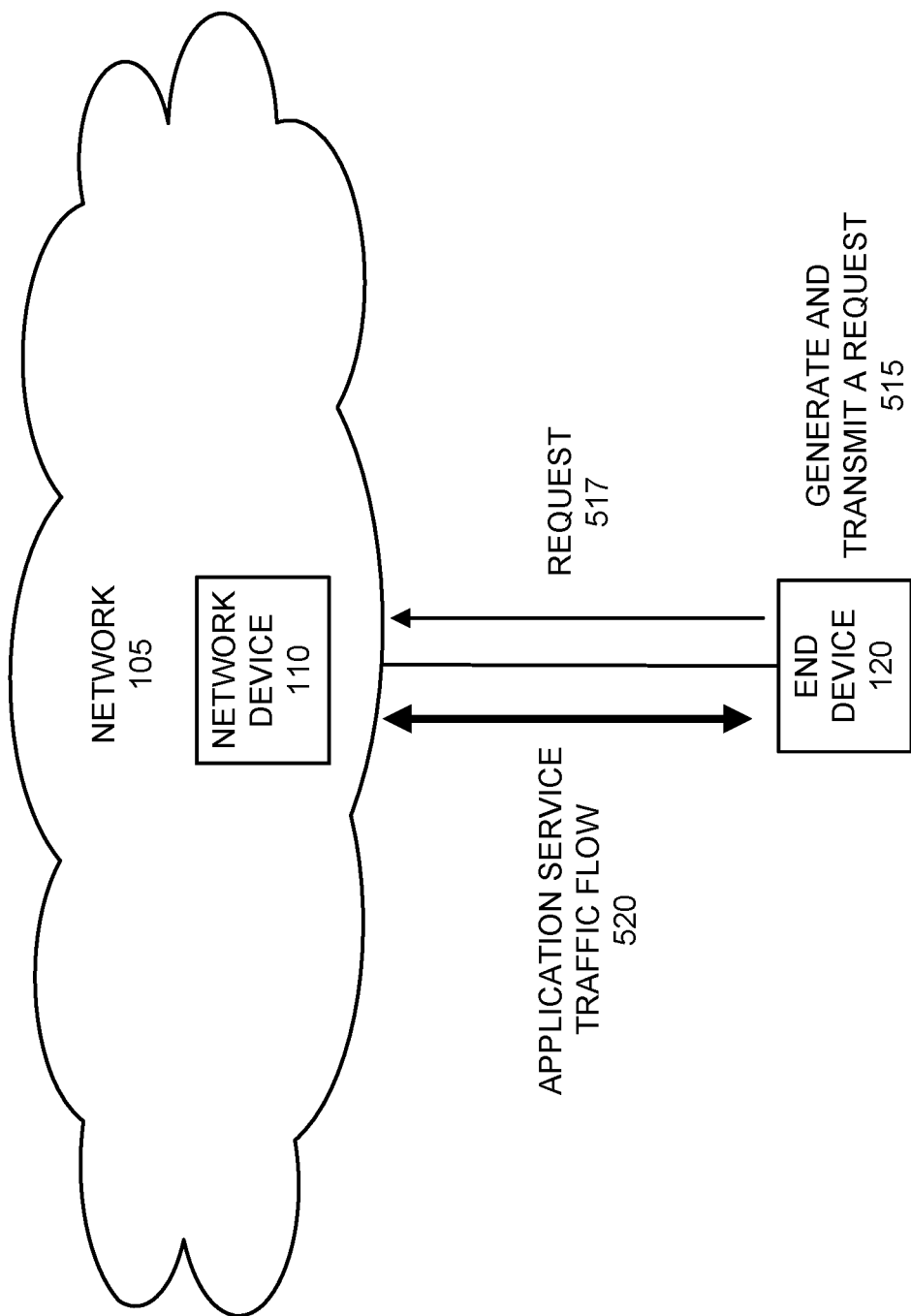

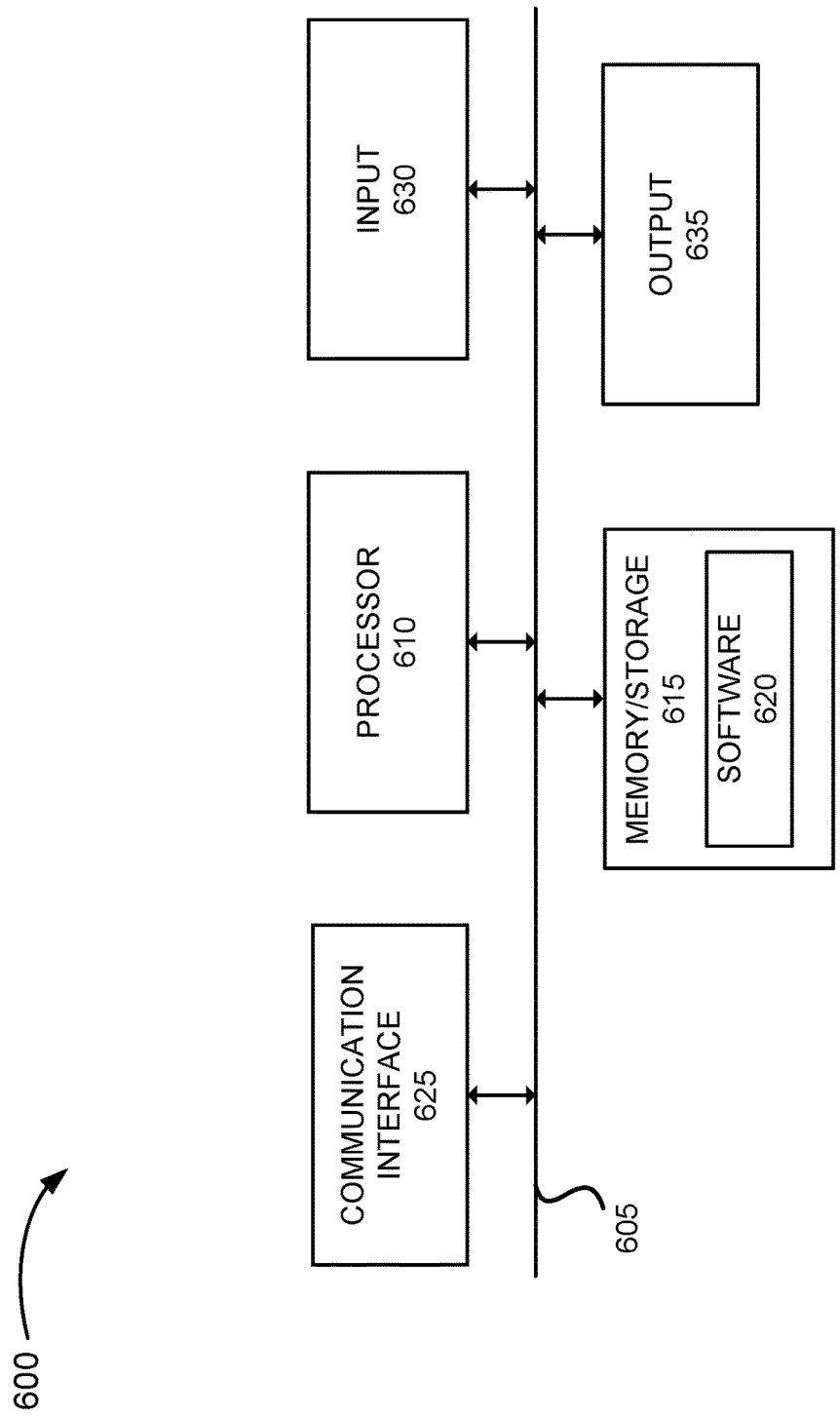

ELASTIC CONTAINER PLATFORM ARCHITECTURE

CROSS REFERENCE TO RELATED APPLICATION

This patent application claims priority to and is a continuation of U.S. patent application Ser. No. 16/266,805, entitled "ELASTIC CONTAINER PLATFORM ARCHITECTURE" and filed on Feb. 4, 2019, the disclosure of which is incorporated herein by reference in its entirety.

BACKGROUND

There are various types of virtualized systems including, for example, an operating system level virtualization and a hypervisor-based virtualization system. Virtualized systems may be used in various types of networks (e.g., an access network, a core network, an application layer network, etc.) and devices (e.g., network devices, end devices, etc.). For example, network function virtualization technologies may be used in a network to provide an application or a service to an end user, or provide another network-related function.

BRIEF DESCRIPTION OF THE DRAWINGS

FIG. 1 is a diagram illustrating an exemplary environment in which an exemplary embodiment of an elastic platform virtualization service may be implemented;

FIGS. 4A-4D are diagrams illustrating an exemplary process of an exemplary embodiment of the elastic platform virtualization service;

FIGS. 5A-5D are diagrams illustrating another exemplary process of an exemplary embodiment of the elastic platform virtualization service;

FIG. 6 is a diagram illustrating exemplary components of a device that may correspond to one or more of the devices illustrated and described herein;

DETAILED DESCRIPTION

Figure 2A:
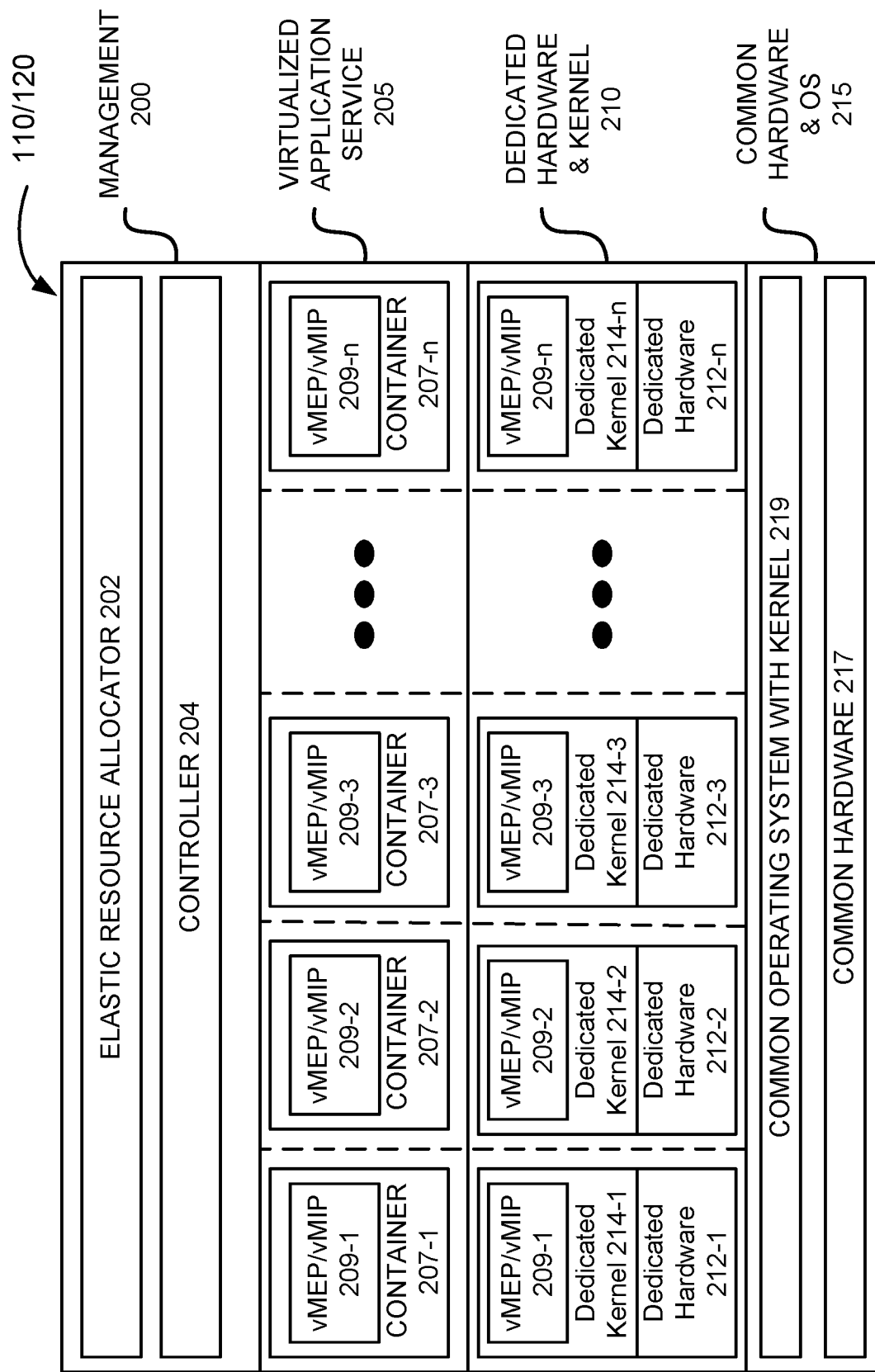
FIG. 2A is diagram illustrating exemplary components of an exemplary embodiment of a device that may provide the elastic platform virtualization service along with Service Operations, Maintenance and Administration (SOAM) capabilities.

The following detailed description refers to the accompanying drawings. The same reference numbers in different drawings may identify the same or similar elements. Also, the following detailed description does not limit the invention.

A container-based virtualization allows multiple isolated user space instances to use a Kernel space within an operating system (OS). The user space instances may be referred to as a container. A container may operate on top of bare metal or a virtualization layer formed of components such as a hypervisor, etc. Typically, each container shares the same OS kernel, and keeps applications, runtimes, and various other services separated from other containers using various kernel features. For example, in the context of a Linux OS, these kernel features may include namespaces and cgroups.

Unfortunately, under current approaches, the sharing of the same kernel by containers may make the containers vulnerable to malicious attacks. For example, a virus-infected container may compromise other containers on the same host via system calls and/or attack the underlying kernel. As a result, such attacks may lead to denial of service, kernel exploits, unauthorized application programming interface (API) access, access to another container's data, and/or other types of malicious activity. Additionally, for example, the sharing of the same kernel by containers may result in degradation of performance of an application, service, or function (referred to herein as an "application service" or a "virtual application service"). For example, lack of good isolation of each container may result in a message not being received by the intended container.

Furthermore, an application can dominate resources underneath the kernel if a good scheduling scheme does not exist. According to exemplary embodiments, an elastic platform virtualization service is described. According to an exemplary embodiment, the elastic platform virtualization service may allow for a container to use a dedicated kernel (e.g., a single kernel dedicated to a single container in which each container has its own kernel), a common kernel (e.g., a kernel for use by any and all containers), or both. According to an exemplary embodiment, the elastic platform virtualization service may also allow the container to use dedicated hardware (e.g., hardware dedicated to a single container in which each container has its own hardware for use), a common hardware (e.g., hardware for use by any and all containers) or both. According to another exemplary embodiment, the elastic platform virtualization service may provide the container a dedicated effective hardware resource, as described herein. According to yet another exemplary embodiment, a container includes a virtual maintenance point (vMP) service. For example, the container may include a virtual maintenance end point (vMEP) and/or a virtual maintenance intermediate point (vMIP), as described herein. Similarly, the kernel may include a vMEP and/or a vMIP, as described herein.

According to an exemplary embodiment, the elastic platform virtualization service may be implemented on a host device that includes a virtualization system, as described herein. For example, the virtualization system may be implemented on a bare metal, a hypervisor, or another type of virtualization component. According to an exemplary embodiment, the virtualization system includes a management layer or control functionality that provides the elastic platform virtualization service. Additionally, the host device includes an OS and hardware, as described herein.

According to an exemplary embodiment, the elastic platform virtualization service allows the container access to the common kernel and common hardware when a usage threshold of the dedicated hardware is exceeded. According to various exemplary embodiments, the container may or may not have a usage limit of the common hardware, as described herein. According to an exemplary embodiment, the elastic platform virtualization service includes a scheduling service that manages the access and use of the common hardware, as described herein. For example, the scheduling service may use a first-in-first-out (FIFO) scheduling scheme, a round robin scheduling scheme, a weighted scheduling scheme, or another type of scheduling scheme that coordinates the access and use of the common hardware among the containers.

According to an exemplary embodiment, the elastic platform virtualization service includes an API service that supports system calls between the container and the kernel, as described herein. For example, the system calls may pertain to requests for threshold usage of hardware (e.g., memory, communication port, processor, etc.) and other types of system calls that are not offered by existing or conventional kernels, as described further below.

As a result of the foregoing, relative to containers that share a common operating system/kernel/hardware framework, the elastic platform virtualization service may improve security issues for a container and the device on which the container operates, based on the dedicated and isolated resources that may be used to support a container, in addition to the dynamic selection of resources (e.g., dedicated, common, dedicated and common) that may be used during a life cycle of the container. Additionally, the dedication of kernels and hardware resources of the elastic platform virtualization service improves the performance and provides additional security for applications running on top of the containers. In an exemplary implementation, the elastic platform virtualization service may be used in situations where there is a need for strict security and high performance for applications. However, the resources may not be efficiently used. In such situations, a hybrid model where containers' access to a common kernel and common hardware, in addition to their dedicated kernels and hardware may be used to achieve a better resource utilization, while the security could be weakened due to the use of a common kernel and common hardware. Therefore, the dedicated elastic platform virtualization service may also be deployed at less protected locations, such as customer premises where strict security is needed, while the hybrid elastic platform can be used in well protected locations, such as service providers' data centers.

FIG. 1 is a diagram illustrating an exemplary environment 100 in which an exemplary embodiment of the elastic platform virtualization service may be implemented. As illustrated, environment 100 includes a network 105 that includes a network device 110. Environment 100 also includes an end device 120.

According to other embodiments, environment 100 may include additional devices, fewer devices, and/or different types of devices than those illustrated and described herein. According to other exemplary embodiments, environment 100 may include additional networks, fewer networks, and/or different networks than those illustrated and described herein.

A network device, a network element, or a network function (referred to herein simply as a network device) may be implemented according to one or multiple computing architectures, such as centralized, distributed, cloud (e.g., elastic, public, private, etc.), edge, fog, and/or another type of computing architecture. Additionally, a network device may be implemented according to one or multiple network architectures, such as client, server, peer, proxy, cloud, Software Defined Networking (SDN), network slicing, logical, and/or another type of network architecture.

Environment 100 includes communication links between network devices, and between end device 120 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Network 105 includes one or multiple networks of one or multiple types and technologies. For example, network 105 may include an access network (e.g., a radio access network (RAN)), a core network, an external network, a local area network (LAN), a metropolitan area network (MAN), a wide area network (WAN), a wireless network, a wired network, an optical network, a backhaul network, a mobile network, a service or an application-layer network, the Internet, the World Wide Web (WWW), an Internet Protocol Multimedia Subsystem (IMS) network, a Rich Communication Service (RCS) network, a cloud network, a packet-switched network, a data center, a service provider network, a mobile or multi-access edge computing (MEC) network, a fog network, an Ethernet network, or another type of network. According to an exemplary embodiment, network 105 provides access to network device 110.

Network device 110 is a network device that includes logic that provides the elastic platform virtualization service, as described herein. The virtualization of network device 110 may be implemented based on a virtual container-based environment, a virtual machine, a hypervisor, and/or other virtualization technologies. According to an exemplary embodiment, network device 110 may include an end device application service. For example, the end device application service may pertain to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), broadcast-like services, and/or other types of assets, services, and/or applications.

According to other exemplary embodiments, network device 110 may include other types of application services or provide other types of functions. For example, network device 110 may provide network-related functions pertaining to security, authentication and authorization, network polices, subscriber profiles, routing, and/or other types of services that facilitate the operation of network 105.

As previously described, network device 110 may be implemented according to various types of computing architectures, network architectures, and other types of technologies. As an example, network device 110 may include a network server (e.g., a web server, a cloud server, a MEC server, a data center server, etc.), that hosts an end device application service, or another type of network device, such as a gateway, a router, a storage device, or other type of network device that provides a network-related function or service. Network device 110 may include one or multiple virtualized devices in which each virtualized device includes a single container and other components (e.g., kernel, hardware, etc.) configured by the elastic platform virtualization service, as described herein. A further description of network device 110 is provided herein.

End device 120 is a device that provides the elastic platform virtualization service, as described herein. According to various exemplary embodiments, end device 120 may be configured to execute various types of software (e.g., applications, programs, etc.). End device 120 may be implemented as a mobile device, a portable device, or a stationary device. For example, end device 120 may be a Mobile Broadband device, an Internet of Things (IoT) device, a user device, customer premise equipment (CPE), a universal CPE (uCPE), a virtual CPE (vCPE), a virtual network interface/demarcation device (vNID), or some other type of end node or intermediary node. By way of further example, end device 120 may be implemented as a smartphone, a personal digital assistant, a tablet, a netbook, a phablet, a wearable device, a set top box, an infotainment system in a vehicle, a vehicle support system, a smart television, a game system, a music playing system, a set top box, a computer, an in-home router, or some other type of end device (e.g., cloud-in-a-box, etc.). End device 120 may include one or multiple virtualized devices in which each virtualized device includes a single container and other components (e.g., kernel, hardware, etc.) configured by the elastic platform virtualization service, as described herein. A further description of end device 120 is provided herein.

FIG. 2A is a diagram illustrating exemplary components of an exemplary embodiment of a network device and/or an end device that provides the elastic platform virtualization service. For example, network device 110 and/or end device 120 may include the components illustrated in FIG. 2A and described herein. Referring to FIG. 2A, network device 110 and/or end device 120 may include a management layer 200, a virtualized application service layer 205, a dedicated hardware and kernel layer 210, and a common hardware and operating system layer 215. According to other exemplary embodiments, network device 110 and/or end device 120 may include additional and/or different layers or functionalities. For example, network device 110 and/or end device 120 may include a virtualization layer, such as a hypervisor, and/or another type of layer. Additionally, according to other exemplary embodiments, network device 110 and/or end device 120 may include additional, fewer, and/or different components in support of virtualization. For example, there are numerous known technologies and/or architectures (e.g., VMware, Citrix, Red Hat, Oracle, containers, virtual machines (VMs), etc.) that support the creation, management, deletion, etc., of a virtualized network device, which may be implemented consistent with the elastic platform virtualization service, as described herein. This description is not intended to provide an exhaustive treatment of such technologies and/or architectures.

As illustrated, management layer 200 may include an elastic resource allocator 202 and a controller 204. Elastic resource allocator 202 includes logic that provides the elastic platform virtualization service. For example, according to various exemplary embodiments, elastic resource allocator 202 may determine the resources used to support a virtualized application service (e.g., container 207), as described herein. For example, elastic resource allocator 202 may determine an elastic platform configuration for container 207 in which container may be supported by only a dedicated kernel and dedicated hardware, a common kernel and common hardware, or both (e.g., dedicated and common components). According to various exemplary embodiments, elastic resource allocator 202 may select the resource used based on the type of container 207 (e.g., a category of the application service provided, such as real-time, mission critical, machine-type communications (MTC), delay-tolerant, and/or other types of nomenclatures or criteria pertaining to application type), the health of the container, threshold values pertaining to usage of hardware (e.g., dedicated hardware, common hardware), performance and/or quality of service metric values (e.g., latency, bitrates, packet loss, throughput, etc.), type of traffic flow (e.g., intermittent, continuous, burst, etc.), and/or other types of criteria, which may pertain to the application service provided, a state of network device 110 and/or end device 120, etc., for example. According to an exemplary embodiment, elastic resource allocator 202 may select the elastic platform configuration during a life cycle of container 207 (e.g., from creation to deletion) one or multiple times depending on one or multiple criteria (e.g., health of the container, type of container, etc.), as described herein. In this regard, elastic resource allocator 202 provides an elastic platform configuration service that may dynamically select an elastic platform configuration for container 207.

According to an exemplary embodiment, the elastic platform configuration service uses a usage threshold of the dedicated resources as a basis to determine whether container 207 may use common resources. For example, the elastic platform configuration service may store a configurable usage threshold value indicating a minimum amount of dedicated hardware being used before container 207 may use the common resources of common hardware and operating system layer 215. According to various exemplary implementations, the usage threshold value may pertain to a specific hardware element (e.g., a processor or a memory or a physical port, etc.), an overall average usage of all hardware elements (e.g., processor, memory, storage, and communication interface), or some sub-combination of hardware elements.

According to various exemplary implementations, the usage threshold value may be a static value or a dynamic value. For example, the usage threshold value may be a value that changes based on a current usage value of common hardware and operating system layer 215, the type of container 207 under consideration for use of the common hardware and operating system layer 215, or another type of configurable criterion.

According to an exemplary embodiment, the elastic platform configuration service may not limit an amount of the common resources available to container 207 when elastic resource allocator 202 determines container 207 is permitted to use common resources when the usage threshold value of dedicated resources has been met. According to another exemplary embodiment, the elastic platform configuration service may limit an amount of the common resources available to container 207 when elastic resource allocator 202 determines container 207 is permitted to use common resources when the usage threshold value of dedicated resources has been met. For example, the elastic platform configuration service may include a common resource limit value that indicates an amount of common resources that may be used. The common resource limit value may be configurable, and may pertain to a specific hardware element (e.g., a processor or a memory or a physical port, etc.), all hardware elements (e.g., processor, memory, storage, and communication interface), or some sub-combination of hardware elements of common hardware and operating system layer 215.

According to various exemplary implementations, the common resource limit value may be a static value or a dynamic value. For example, the common resource limit value may be a value that changes based on a current usage value of common hardware and operating system layer 215, the type of container 207 under consideration for use of the common hardware and operating system layer 215, or another type of configurable criterion.

According to various exemplary embodiments, the elastic platform configuration service may include the scheduling service. For example, the scheduling service may be invoked regardless of whether there is a limit or not to the common resources. In this regard, container 207 may be subject to a schedule that applies to its access and use of the common resources. For example, as previously mentioned, the scheduling service may use a first-in-first-out scheduling scheme, a round robin scheduling scheme, a weighted scheduling scheme (e.g., a weighted round robin, etc.), or another type of scheduling scheme that coordinates the access and use of the common hardware among the containers 207 (e.g., shortest remaining time first, fixed priority, work-conserving, or other types of conventional, proprietary, or future generation scheduling techniques).

According to an exemplary embodiment, elastic resource allocator 202 may control port allocation in relation to the common resources when the threshold usage value of dedicated resources is satisfied by container 207. According to an exemplary implementation, elastic resource allocator 202 may not partition (e.g., use of full bandwidth) the common physical port used by container 207 to transmit and receive data (e.g., to and from end device 120), and each container 207 may be subject to a scheduling scheme of the scheduling service relating to access and use of the common physical port. According to another exemplary implementation, elastic resource allocator 202 may partition (e.g., use a portion of the available bandwidth) the common physical port used by container 207, and each container 207 may be subject to a scheduling scheme.

As previously described, elastic resource allocator 202 may determine an elastic platform configuration for container 207 in which container 207 may be supported by only a dedicated kernel and dedicated hardware, a common kernel and common hardware, or both (e.g., dedicated and common components). According to an exemplary embodiment, the dedicated hardware available to container 207 may include an effective number of processor cycles (e.g., the number of virtual central processing unit (CPU) cycles for a given container 207) (referred to as effective virtual CPU (vCPU)). As described in U.S. patent application Ser. No. 15/957,311, which is incorporated herein by reference in its entirety, the effective number of vCPU may be calculated in a manner that takes buffer memory size into account. According to other exemplary implementations, the effective vCPU may be based on a committed load, a peak load, or various types of traffic flows.

Controller 204 includes logic that manages containers 207 based on various services (e.g., networking, security, object storage, orchestration, data management, etc.). For example, controller 204 may be implemented to include an OpenStack controller node or similar entity (e.g., a Virtual Infrastructure Manager (VIM), etc.) belonging to a virtualization technology/architecture. Controller 204 may include underlying hardware awareness functionalities, such as CPU Pinning, a Single Root I/O Virtualization and Sharing (SR-IOV) component, Data Plane Development Kit (DPDK), and field programmable gate array (FPGA) accelerator.

Elastic resource allocator 202 may include dedicated hardware (e.g., a processor, memory, physical port, etc.) or hardware/software components that support the logic for providing the elastic platform virtualization service. Alternatively, elastic resource allocator 202 may use physical resources of common hardware and operating system layer 215. Controller 204 may be similarly configured (e.g., dedicated hardware, use physical resources of common hardware and operating system layer 215, etc.).

Virtualized application service layer 205 includes one or multiple containers 207. For purposes of illustration, FIG. 2A illustrates container 207-1 through container 207-n in which each container 207 provides a virtual application service. The term "container," as used herein, is intended to be broadly interpreted to include a virtualized device that provides the virtual application service. In this regard, container 207 may be a virtual network function (VNF), a virtual machine (VM), a container (e.g., an operating system virtualization without a hypervisor), or another type of user or guest space entity that provides the virtual application service.

Dedicated hardware and kernel layer 210 may include a dedicated hardware 212 for each container 207. For purposes of illustration, FIG. 2A illustrates dedicated hardware 212-1 through 212-n. Dedicated hardware 212 may include various types of physical resources and/or hardware, such as for example, a processor, a memory, a communication interface (e.g., transmitter, receiver, buffer, port), a storage device (e.g., a hard drive, etc.), a Single Root I/O Virtualization and Sharing (SR-IOV) component, Data Plane Development Kit (DPDK), FPGA accelerator, and/or another type of resource, as described further below.

Dedicated hardware and kernel layer 210 may include a dedicated kernel 214 of an operating system for each container 207. For purposes of illustration, FIG. 2A illustrates dedicated kernel 214-1 through 214-n. Dedicated kernel 214 may include the kernel of an operating system. For example, dedicated kernel 214 may be implemented as a kernel of Linux, OpenStack, Windows Server, or other conventional, proprietary, or future generation operating system.

Figure 3:
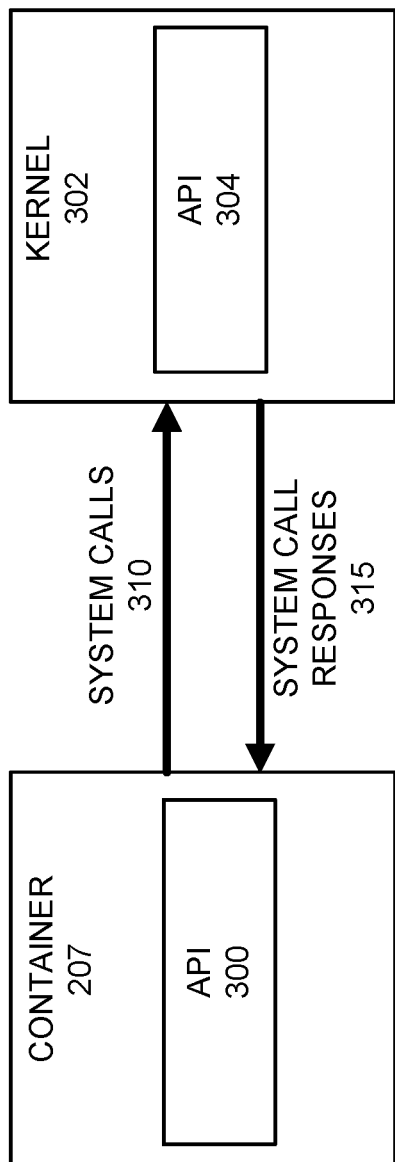
FIG. 3 is a diagram illustrating an exemplary process of an exemplary embodiment of the elastic platform virtualization service.

According to an exemplary embodiment, the elastic platform virtualization service provides an API service, as previously described. Referring to FIG. 3, container 207 may include an API 300 that communicates with an API 304 of a kernel 302. For example, system calls 310 and system call responses 315 may be exchanged. Kernel 302 may be dedicated kernel 214 or a kernel of a common operating system with kernel 219, which may be included in common hardware and operating system layer 215, as described and illustrated in FIG. 2A. API 300 and API 304 may each include logic that provides a system call interface for container 207 to access system resources and services of dedicated kernel 214 or the kernel of layer 215. Kernel 302 include other components that are not illustrated and described for the sake of brevity (various libraries, library wrapper functions, etc.).

According to an exemplary embodiment, system calls 310 supported by API 300 and API 304 may include standard system calls of the kernel of the operating system. For example, when kernel 302 is a kernel of the Linux operating system, API 304 may support various types of system calls associated with the kernel (depending on the version of the kernel), such as open, getpid, socket, pwritev, preadv, and so forth.

Additionally, according to an exemplary embodiment, API 300 and API 304 may each include logic for system calls 310 that support the elastic platform virtualization service, which may not be standard system calls supported by an out-of-the-box operating system/kernel. According to an exemplary implementation, system calls 310 may include: number of CPUs; random access memory (RAM) in bytes; storage (e.g., hard drive, etc.) in bytes; threshold for CPU usage; threshold for memory usage; threshold for port usage; and scheduler options for each port. In addition, system calls 310 may include assigning a specific CPU to a specific container 207, assigning a specific CPU to be shared among containers 207, assigning a specific physical port to be shared among containers 207, assigning a specific memory block to be shared among containers 207, assigning a specific memory block to a specific container 207, assigning a specific physical port to a specific container 207, assigning a scheduler name to a specific port, assigning a specific committed bandwidth of a physical port to a specific container 207, setting a maximum utilization percentage threshold for a given CPU, setting an average utilization percentage threshold for a given CPU, setting a maximum utilization percentage threshold for a given memory block or volume, setting an average utilization percentage threshold for a given memory block or volume; setting a maximum utilization percentage threshold for a given physical port and setting an average utilization percentage threshold for a given physical port. Still further, system calls 310 may include setting a time interval value (e.g., in seconds) for a maximum utilization percentage threshold, setting a time interval value (e.g., in seconds) for an average utilization percentage threshold, initiating a connectivity check at a specific MEP, initiating delay measurement at a specific MEP for a given connection between two containers 207, between two kernels 214 and/or between a kernel 214 and a container 207, and initiating loss measurement at a specific MEP for a given connection between two containers 207, between two kernels 214 and/or between a kernel 214 and container 207.

Referring back to FIG. 2A, according to an exemplary embodiment, the elastic platform virtualization service may include a vMP service. As described in U.S. patent application Ser. No. 16/033,651, which is incorporated herein by reference in its entirety, a virtual service operations, administration, and management (vSOAM) system that includes vMEPs and vMIPs that may initiate and terminate Continuity Check messaging (CCM) sessions, loopback messaging (LBM) sessions, and link trace messaging (LTM) sessions for each virtual layer and between virtual layers. In particular, the vMEPs and vMIPs may conduct messaging sessions to: test and monitor connection integrity; communication links between different application components; and verify a list of participating devices for a particular service.

According to an exemplary embodiment, each container 207 and each dedicated kernel 214 may include a vMEP and/or a vMIP 209 (vMEP/vMIP 209). Although vMEPs/vMIPs 209 are labeled the same in, for example, container 207-1 and dedicated kernel 214-1, vMEPs/vMIPs 209 may perform different functions for containers 207 and dedicated kernels 214. For purposes of illustration, FIG. 2A illustrates vMEP/vMIP 209-1 through 209-n. vMEP/vMIP 209 may provide one or multiple types of services and messaging, as described in U.S. patent application Ser. No. 16/033,651. Additionally, for example, vMEP/vMIP 209 may include other types of services that support the elastic platform virtualization service. For example, vMEP/vMIP 209 may include logic that may initiate and terminate a connectivity verification (CV) session. Additionally, for example, vMEP/vMIP 209 may include logic that may initiate and respond to SOAM messages, such as connectivity verifications. The SOAM messages may verify the health of container 207, kernels 214 and 219 and hardware 212 and 217.

Common hardware and operating system layer 215 include a common hardware 217 and common operating system with kernel 219. Common hardware 217 may include physical resources/hardware similar to those described in relation to dedicated hardware 212. Additionally, common operating system with kernel 219 may include an operating system that includes a kernel (e.g., kernel 302). As described herein, common hardware and operating system layer 215 may be available for use by container 207.

Figure 2B:
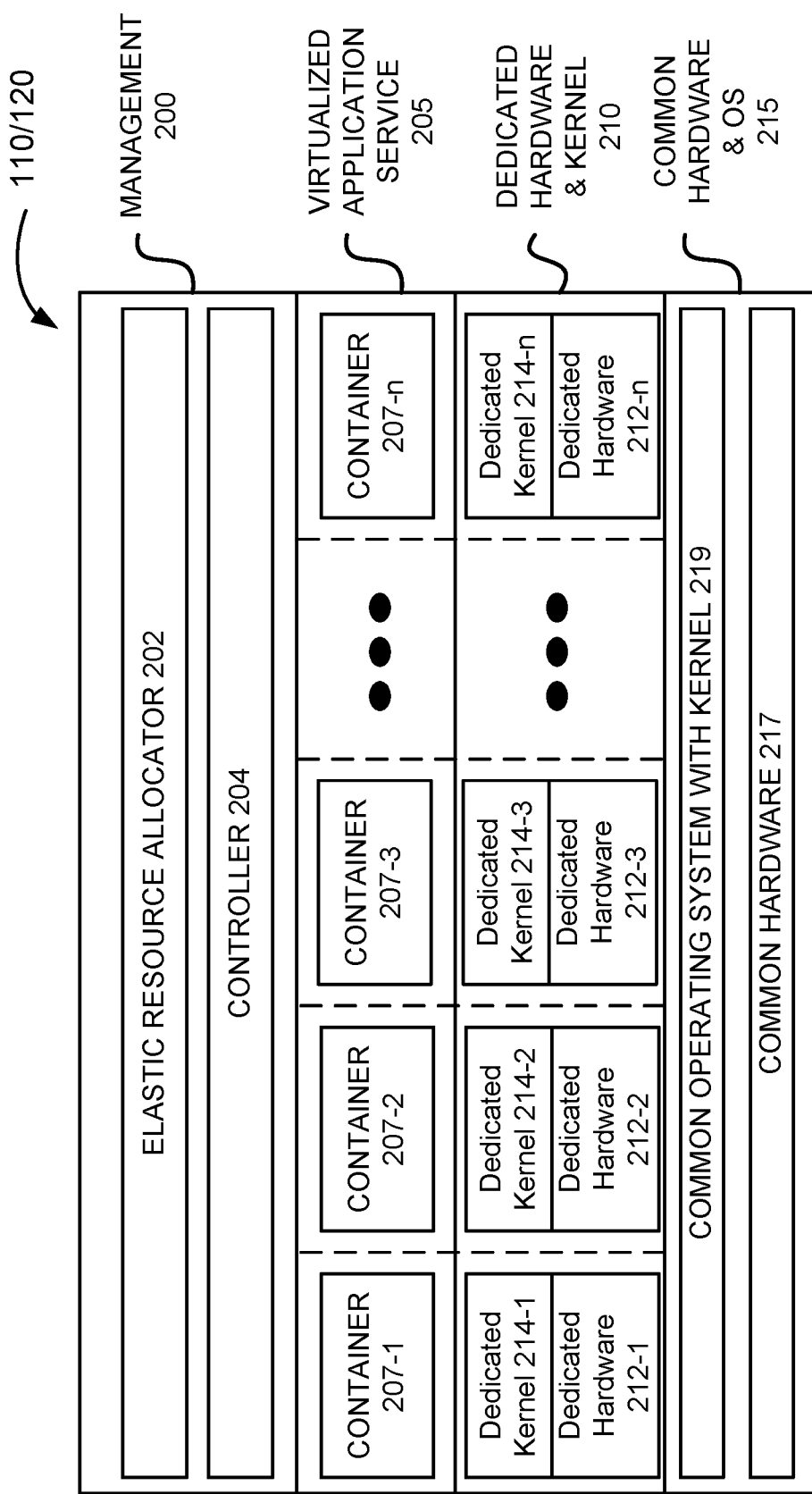
FIG. 2B is diagram illustrating exemplary components of another exemplary embodiment of a device that may provide the elastic platform virtualization service.

FIG. 2B is a diagram illustrating exemplary components of another exemplary embodiment of a network device and/or an end device that provides the elastic platform virtualization service. For example, network device 110 and/or end device 120 may include the components illustrated in FIG. 2B and described. In contrast to FIG. 2A, the elastic platform virtualization service may not include the vMP service, as described herein. For example, each container 207 and kernel 214 may not include vMEP/vMIP 209. Otherwise, network device 110 and/or end device 120 may provide the elastic platform virtualization service in manner similar to that described in relation to FIG. 2A.

Although FIGS. 2A and 2B each depicts a component (e.g., elastic resource allocator 202) resident on network device 110 and/or end device 120 that provides the elastic platform virtualization service, according to other exemplary embodiments, the elastic platform virtualization service may be implemented, entirely or in part, by a device remote from these virtualized devices. For example, a network device, which may be a standalone network device, may provide the elastic platform virtualization service remote from the virtualized device. According to various exemplary implementations, the remote network device may be aware of the total resources of the end device or network device, current use of the resources, health of the virtual device, connectivity of the virtual device, and/or other parameters that pertain to the sub-services of the elastic platform virtualization service (e.g., the vMP service, the scheduling service, etc.), as described herein.

Figure 4B:
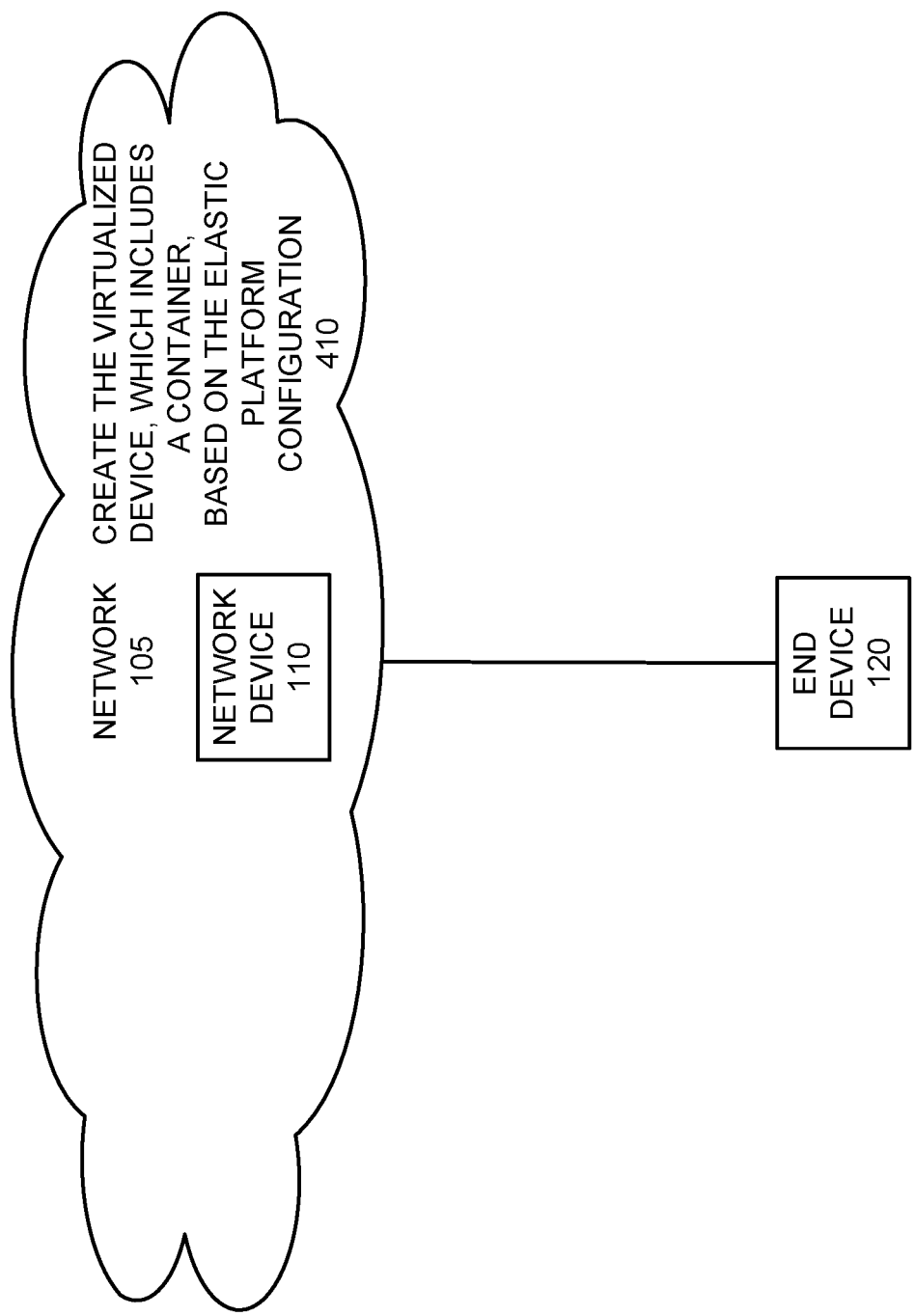

FIGS. 4A-4D are diagrams illustrating an exemplary process of the elastic platform virtualization service from a network-side perspective. Referring to FIG. 4A, assume that end device 120 and network device 110 establish a connection. Subsequent to the establishment of the connection, end device 120 may transmit a request 403 to establish a session for an application service offered by network device 110. For example, the application service may pertain to a video streaming service, a voice service, a critical application, or some other type application service. Network device 110 may receive the request 405.

In response to receiving the request, network device 110 may determine the elastic platform configuration 407 that supports the virtualized device (e.g., container 207, etc.). For example, container 207 may support the network-side of an application service (e.g., a server or another type of network architecture entity (e.g., proxy, peer, etc.)). According to an exemplary embodiment, the selection of resources may include a tertiary choice between only dedicated resources (dedicated hardware 212, dedicated kernel 214), only common resources (e.g., resources of common hardware and operating system layer 215), or a combination of dedicated and common resources, as described herein.

Additionally, according to an exemplary embodiment, network device 110 may determine the elastic platform configuration 407 pertaining to various sub-services, such as port allocation, the scheduling service, the vMP service, the usage threshold value of dedicated resources, whether to limit or not an amount of the common resources available to the virtualized device, and/or other sub-services and parameters pertaining to the sub-services, as described herein. According to various exemplary embodiments, network device 110 may make this determination based on one or multiple criteria, as described herein. For example, network device 110 may select one of the tertiary choices based on the type of container 207 (e.g., a category of the application service provided, such as real-time, mission critical, MTC, delay-tolerant, and/or other types of nomenclatures or criteria pertaining to application type), the current health of other containers 207, current usage values of common hardware 217, performance and/or quality of service metric values (e.g., latency, bitrates, packet loss, throughput, etc.) pertaining to the requested application service, type of traffic flow (e.g., intermittent, continuous, burst, etc.) pertaining to the requested application service, and/or other types of criteria, which may pertain to the application service provided or a current state of network device 110.

Referring to FIG. 4B, network device 110 may create the virtualized device, which includes a container 207, based on the determined elastic platform configuration 410. For example, container 207 may be allocated only dedicated resources, only common resources, or a combination of dedicated and common resources. Additionally, for example, the elastic platform configuration of container 207 may include configurations pertaining to one or multiple sub-services of the elastic platform virtualization service, as described herein.

Figure 4C:
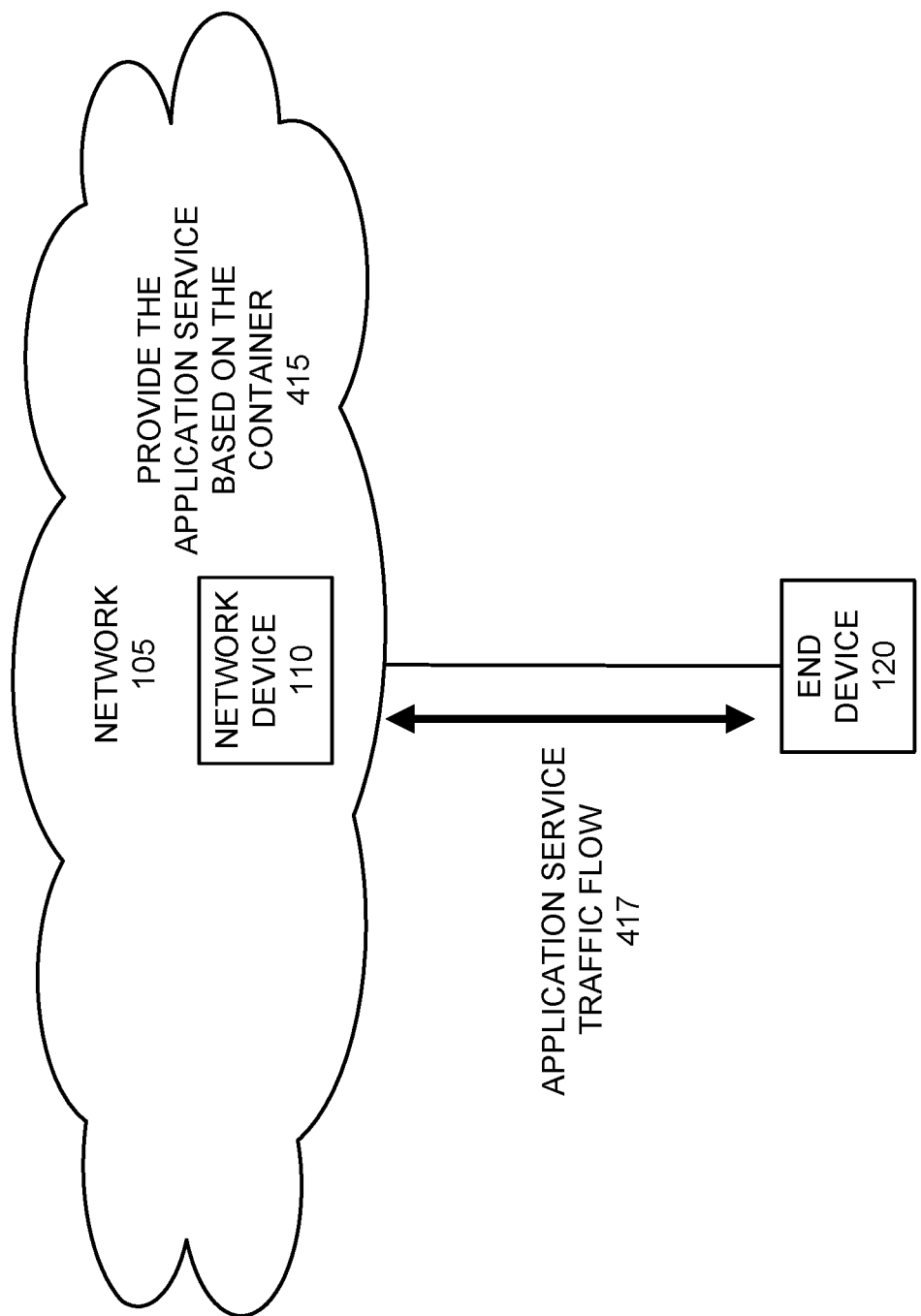

Referring to FIG. 4C, network device 110 may provide the application service based on the container 415 and responsive to the request of end device 120. For example, an application service traffic flow 417 between network device 110 and end device 120 may be established.

Figure 4D:
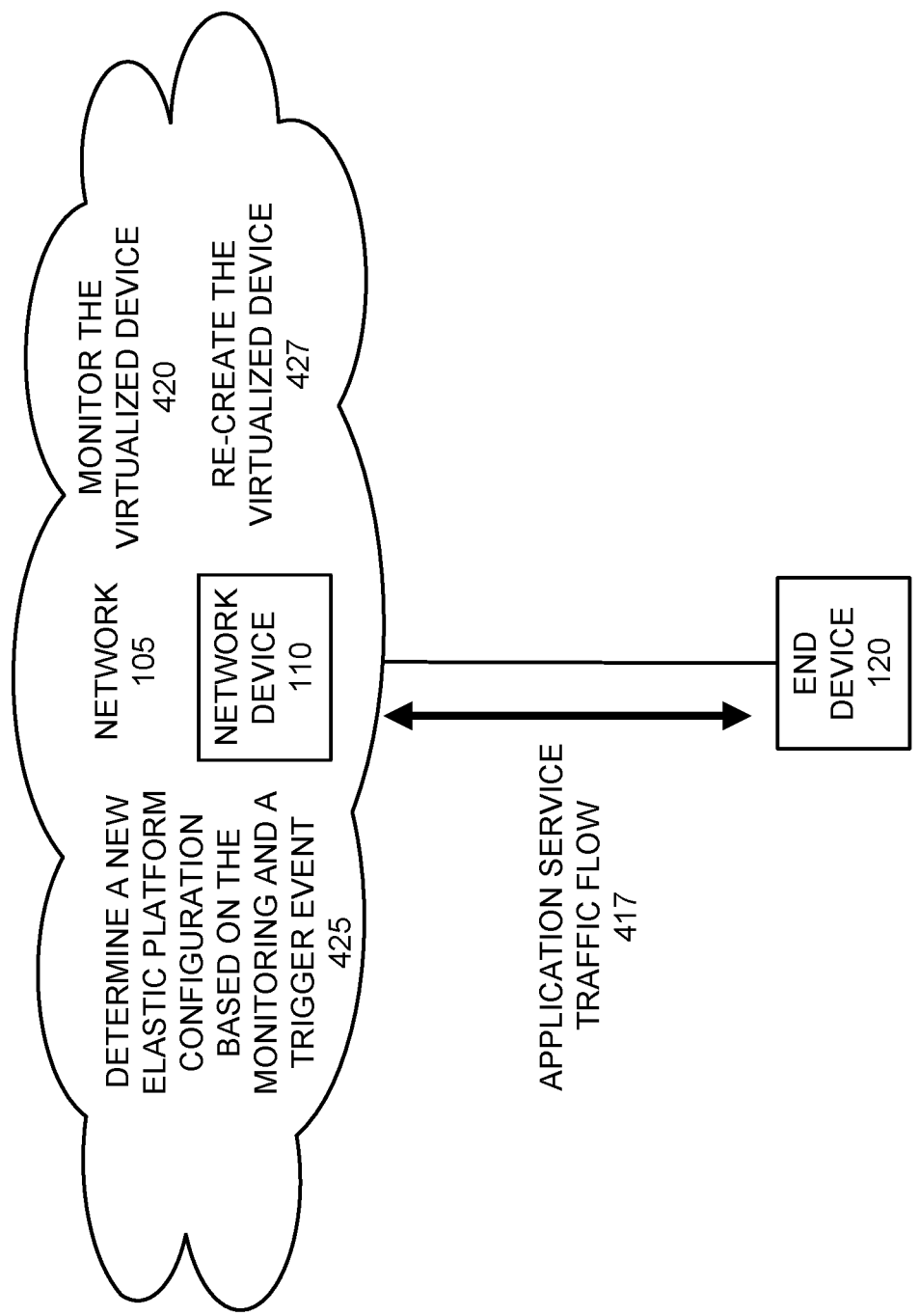

Referring to FIG. 4D, network device 110 may monitor the virtualized device 420. According to an exemplary embodiment, the elastic platform virtualization service for container 207 of network device 110 may monitor a usage threshold value of dedicated hardware 212, and determine whether the usage threshold value has been exceeded. According to another exemplary embodiment, based on the vMP service, the elastic platform virtualization service for container 207 of network device 110 may monitor the health and/or connectivity of container 207. According to still other exemplary embodiments, the elastic platform virtualization service for container 207 and/or other containers 207, network device 110 may monitor resource (e.g., dedicated, common) usage, health, port allocation, and/or other sub-services to determine whether the elastic platform configuration should remain the same or a new elastic platform configuration should be determined.

According to an exemplary scenario, assume that network device 110 detects a triggering event during the monitoring that causes network device 110 to determine a new elastic platform configuration 425. For example, the triggering event may relate to a malicious attack of another container 207, exceeding the usage threshold value of dedicated resources by container 207, or some other type of event. Based on the determined new elastic platform configuration, network device 110 may re-create the virtualized device 427, and the application service may continue to be provided to end device 120. The elastic platform virtualization service may be provided during the life of container 207/the application service, and depending on various criteria (e.g., health of container, etc.), as described herein, network device 110 may change the allocation and use of resources (e.g., dedicated to dedicated and common, or dedicated to common, etc.) that support container 207.

Although FIGS. 4A-4D illustrate an exemplary process of the elastic platform virtualization service, according to other exemplary embodiments, the process may include additional, different, and/or fewer steps. For example, network device 110 may perform one or multiple steps, as described and illustrated, when container 207 is already created and running and/or before an end device request for the application service is received. Additionally, or alternatively, according to other exemplary embodiments, network device 110 may determine the elastic platform configuration, and create the virtualized device in the absence of receiving a request from end device 120 or another type of device, and/or may not involve communication with end device 120 or another device. Additionally, for example, according to an exemplary embodiment, the elastic platform virtualization service may invoke the vMP service or other sub-services (e.g., the API service, etc.) at any time and in response to various triggering events or configurations, as described herein.

Figure 5A:
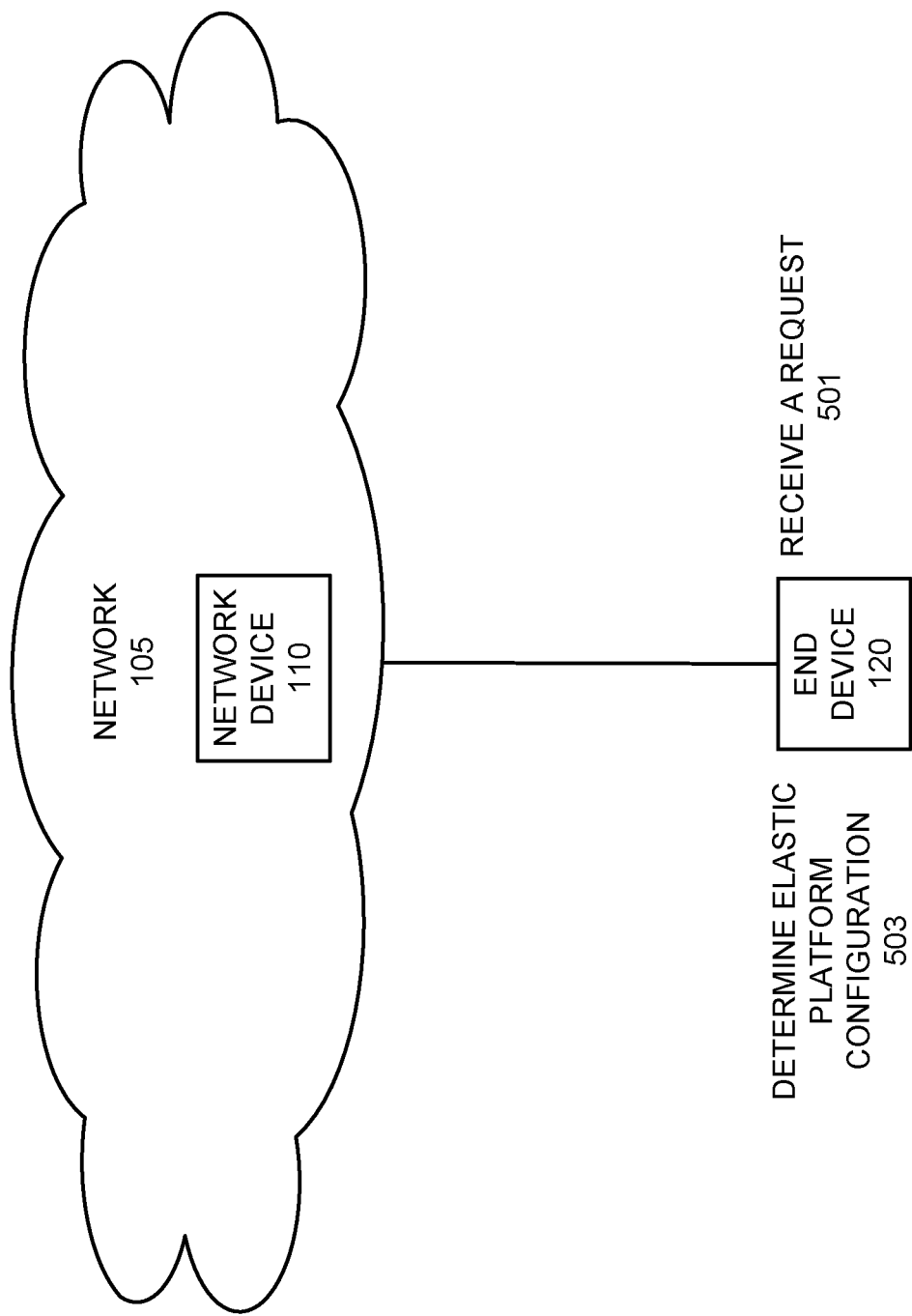

FIGS. 5A-5D are diagrams illustrating another exemplary process of the elastic platform virtualization service from an end device-side perspective. Referring to FIG. 5A, assume that end device 120 receives a request 501 for an application service. For example, a user of end device 120 (not illustrated) may provide an input to end device 120. Alternatively, for example, the request may not relate to a user input, but may be a configuration of end device 120 (e.g., data to transmit, a schedule to use the application service, or another type of configuration).

In response to the request, end device 120 may determine an elastic platform configuration 503 that supports the virtualized device (e.g., container 207, etc.). According to an exemplary embodiment, the selection of resources may include a tertiary choice between only dedicated resources (dedicated hardware 212, dedicated kernel 214), only common resources (e.g., resources of common hardware and operating system layer 215), or a combination of dedicated and common resources, as described herein.

Additionally, according to an exemplary embodiment, end device 120 may determine the elastic platform configuration pertaining to various sub-services, such as port allocation, the scheduling service, the vMP service, the usage threshold value of dedicated resources, whether to limit or not an amount of the common resources available to the virtualized device, and/or other sub-services and parameters pertaining to the sub-services, as described herein. According to various exemplary embodiments, end device 120 may make this determination based on one or multiple criteria, as described herein. For example, end device 120 may select one of the tertiary choices based on the type of container 207 (e.g., a category of the application service provided, such as real-time, mission critical, MTC, delay-tolerant, and/or other types of nomenclatures or criteria pertaining to application type), the current health of other containers 207, current usage values of common hardware 217, performance and/or quality of service metric values (e.g., latency, bitrates, packet loss, throughput, etc.) pertaining to the requested application service, type of traffic flow (e.g., intermittent, continuous, burst, etc.) pertaining to the requested application service, and/or other types of criteria, which may pertain to the application service provided or a current state of end device 120.

Referring to FIG. 5B, end device 120 may create the virtualized device, which includes a container 207, based on the determined elastic platform configuration 510. For example, container 207 may be allocated only dedicated resources, only common resources, or a combination of dedicated and common resources. Additionally, for example, the elastic platform configuration of container 207 may include configurations pertaining to one or multiple sub-services of the elastic platform virtualization service, as described herein. In response to the creation of the virtualized device, end device 120 may provide the application service based on the container 512 and responsive to the request of end device 120. For example, container 207 may support the end device-side of an application service (e.g., a client or another type of network architecture entity (e.g., proxy, peer, etc.)).

Referring to FIG. 5C, end device 120 may generate and transmit a request 515 to network device 110. A request 517 may be a request for an application service from the network-side. Network device 110 may receive the request, and an application service traffic flow 520 between network device 110 and end device 120 may be established.

Figure 5D:
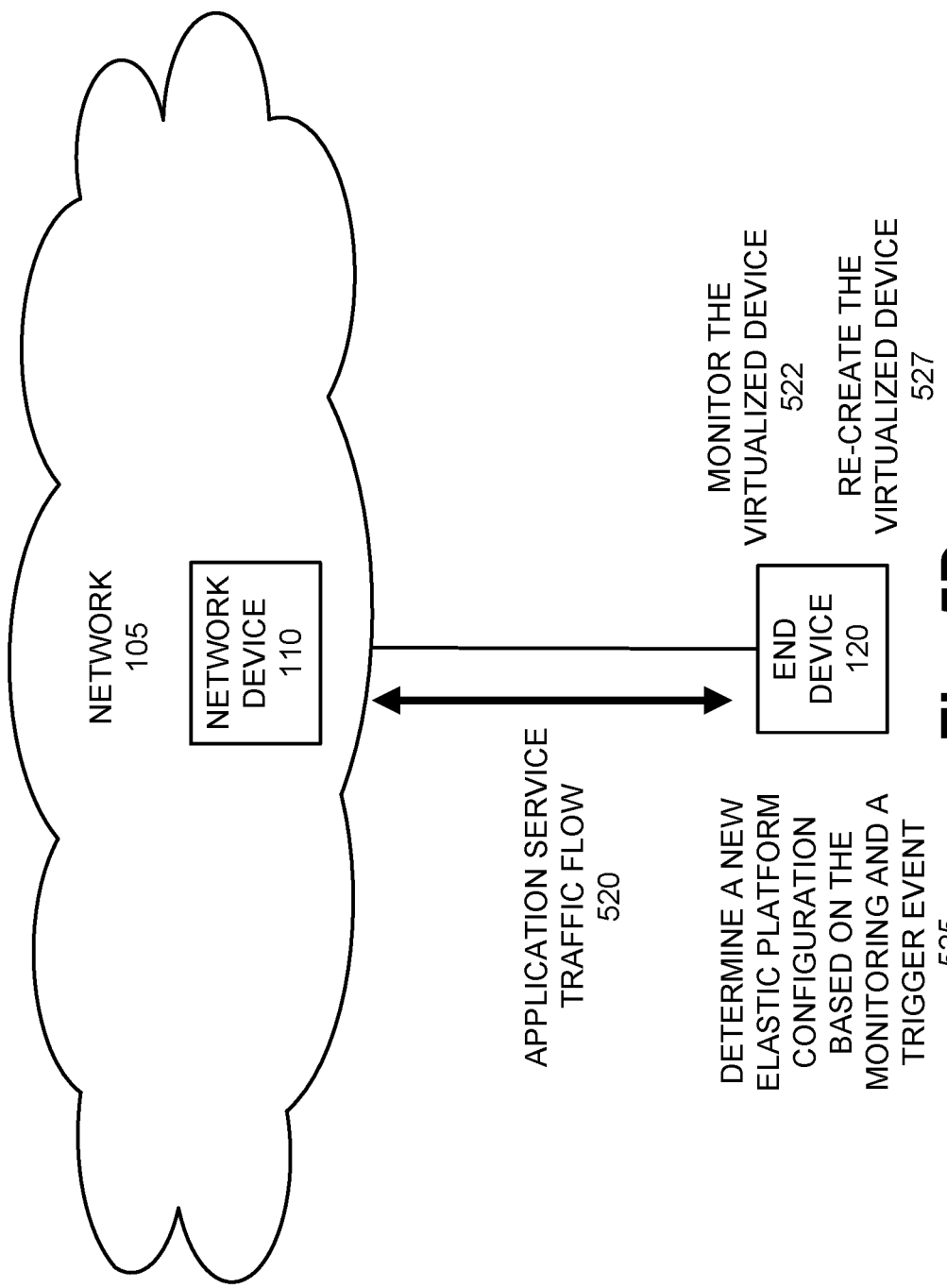

Referring to FIG. 5D, end device 120 may monitor the virtualized device 522. According to an exemplary embodiment, the elastic platform virtualization service for container 207 of end device 120 may monitor a usage threshold value of dedicated hardware 212, and determine whether the usage threshold value has been exceeded. According to another exemplary embodiment, based on the vMP service, the elastic platform virtualization service for container 207 of end device 120 may monitor the health and/or connectivity of container 207. According to still other exemplary embodiments, the elastic platform virtualization service for container 207 and/or other containers 207, end device 120 may monitor resource (e.g., dedicated, common) usage, health, port allocation, and/or other sub-services to determine whether the elastic platform configuration should remain the same or a new elastic platform configuration should be determined.

According to an exemplary scenario, assume that end device 120 detects a triggering event during the monitoring that causes end device 120 to determine a new elastic platform configuration 525. For example, the triggering event may relate to a malicious attack of another container 207, exceeding the usage threshold value of dedicated resources by container 207, or some other type of event. Based on the determined new elastic platform configuration, end device 120 may re-create the virtualized device 527, and the application service may continue to be provided to end device 120.

Although FIGS. 5A-5D illustrate an exemplary process of the elastic platform virtualization service, according to other exemplary embodiments, the process may include additional, different, and/or fewer steps. For example, end device 120 may perform one or multiple steps, as described and illustrated, when container 207 is already created and running and/or before a request for the application service is received. Additionally, or alternatively, according to other exemplary embodiments, end device 120 may determine the elastic platform configuration, and create the virtualized device in the absence of receiving a request, and/or may not involve communication with network device 110 or another device. Additionally, for example, according to an exemplary embodiment, the elastic platform virtualization service may invoke the vMP service or other sub-services (e.g., the API service, etc.) at any time and in response to various triggering events or configurations, as described herein.

FIG. 6 is a diagram illustrating exemplary components of a device 600 that may be included in one or more of the devices described herein. For example, device 600 may correspond to components included in dedicated hardware 212 and common hardware 217 of network device 110 and end device 120. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc. Processor 610 may also be implemented as a multiprocessor system.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to network device 110 and/or end device 120, and elastic resource allocator 202, software 620 may include an application that, when executed by processor 610, provides the functions of the elastic platform virtualization service, as described herein. Software 620 may also include firmware, middleware, microcode, hardware description language (HDL), and/or other form of instruction. Software 620 may further include an operating system (OS) (e.g., Windows, Linux, OpenStack, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna, a communication port, and/or a buffer Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
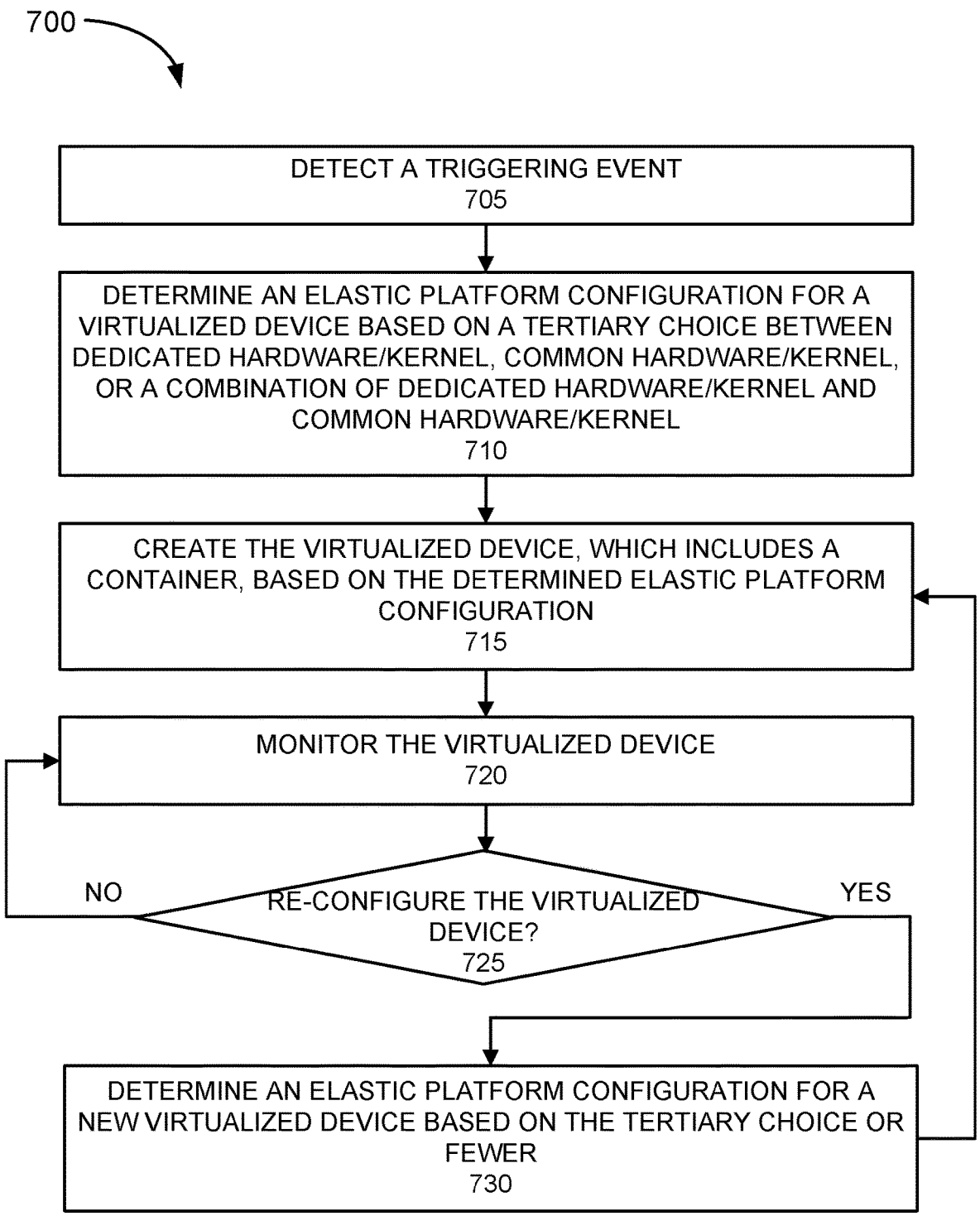
FIG. 7 is a flow diagram illustrating an exemplary process of an exemplary embodiment of the elastic platform virtualization service.

FIG. 7 is a flow diagram illustrating an exemplary process 700 of an exemplary embodiment of the elastic platform virtualization service. According to an exemplary embodiment, network device 110 or end device 120 may perform steps of process 700. For example, processor 610 executes software 620 to perform the steps illustrated in FIG. 7, and described herein. According to an exemplary embodiment, elastic resource allocator 202 may perform one or multiple steps of process 700.

Referring to FIG. 7, in block 705, a triggering event may be detected. For example, network device 110 or end device 120 may detect an event that triggers the creation of a virtualized device. The virtualized device is to be configured to provide an application service. According to various exemplary implementations, the event may be a request from another device (e.g., end device 120, network device 110, another device, a user, a schedule, or another type of reasons).

In block 710, an elastic platform configuration for a virtualized device may be determined based on a tertiary choice between the virtualized device supported by dedicated hardware/dedicated kernel, a common hardware/common kernel, or a combination of dedicated hardware/dedicated kernel and common hardware/common kernel. For example, network device 110 or end device 120 may include elastic virtualization components illustrated in FIG. 2A or 2B. The elastic virtualization components may determine the appropriate resources (e.g., dedicated, common, etc.) and other configurations pertaining to sub-services of the elastic platform virtualization service, as described herein.

In block 715, the virtualized device, which includes a container, may be created based on the determined elastic platform configuration. For example, the elastic platform virtualization service of network device 110 or end device 120 may create the container-based virtualized device based on the determined elastic platform configuration.

In block 720, the virtualized device may be monitored. For example, the elastic platform virtualization service of network device 110 or end device 120 may monitor the state of the virtualized device (e.g., health, resource usage, etc.).

In block 725, it may be determined whether to re-configure the virtualized device. For example, the elastic platform virtualization service of network device 110 or end device 120 may determine whether to re-configure the virtualized device based on one or multiple criteria, as described herein. For example, the one or multiple criteria may pertain to the health of container 207 and/or other containers 207, hardware utilization, and so forth, as described herein.

When it is determined to not reconfigure the virtualized device (block 725—NO), process 700 may return to block 720. When it is determined to reconfigure the virtualized device (block 725—YES), an elastic platform configuration for a new virtualized device may be determined based on the tertiary choice or fewer (block 730). For example, the elastic platform virtualization service of network device 110 or end device 120 may re-configure a new virtualized device based on one or multiple criteria. Depending on context, the elastic platform configuration may be based on the tertiary choice (e.g., where all three hardware/kernel options are still available) or fewer than the tertiary choice. For example, if the common hardware/kernel is corrupted, the elastic platform virtualization service may limit a configuration to dedicated hardware/kernel resources. Alternatively, for example, when the usage of common hardware/kernel is high, the elastic platform virtualization service may limit a configuration to dedicated hardware/kernel resources or a combination of dedicated hardware/kernel resources and (a portion of) common hardware/kernel resources.

Although FIG. 7 illustrates an exemplary process 700 of the elastic platform virtualization service, according to other embodiments, process 700 may include additional operations, fewer operations, and/or different operations than those illustrated in FIG. 7, and described herein. For example, process 700 may include determining whether the virtualized device and application service is to be deleted according to a life cycle. For example, this may be performed as a part of the monitoring of block 720 and/or prior to performing block 725.

As described above, vMEPs/vMIPs 209 may be located at each container 207 and each dedicated kernel 214. In an exemplary implementation, vMEP/vMIP 209 may be located at container 207 and kernel 214 interfaces to allow the elastic platform virtualization service to periodically test inter-workings of containers 207 and kernels 214 and determine metrics, such as delay, loss, etc., or other health/status issues. For example, FIG. 8 illustrates an exemplary implementation in which vMEPs 209 are located at container 207 and kernel 214 interfaces and are configured to allow for testing of the containers 207 and kernels 214.

Figure 8:
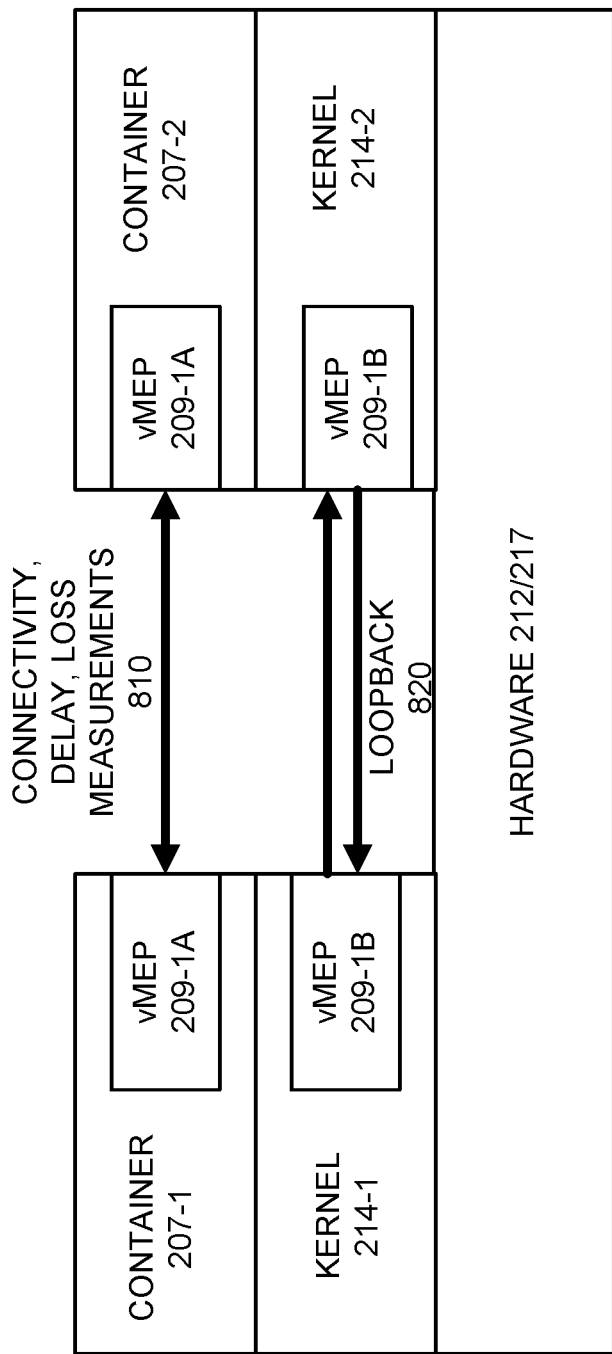
FIG. 8 is a diagram illustrating exemplary SOAM testing associated with the elastic platform virtualization service.

Referring to FIG. 8, container 207-1 includes vMEP 209-1A and kernel 214 includes vMEP 209-1B located at the respective container and kernel interfaces. Similarly, container 207-2 includes vMEP 209-2A and kernel 214-2 includes vMEP 209-2B at the respective container and kernel interfaces. Containers 207 and kernels 214 may include the same or different hardware, such as dedicated hardware 212 or common hardware 217. In this example, vMEP 209-1A of container 207-1 may send signals to vMEP 209-2A of container 207-2, such as test signals/packets having a predetermined payload. vMEP 209-2A may receive the signals and send return signals to vMEP 209-1A. vMEP 209-1A receives the return signals and determines various health/status related information 810, such as whether any connectivity issues exist between containers 207-1 and 207-2, determines a delay time associated with the transmission and reception of the test signals between containers 207-1 and 207-2, determines loss measurements, such as packet loss between containers 207-1 and 207-2, and performs other health/status related measurements.

vMEP 209-1B of kernel 214-1 may similarly send test signals to vMEP 209-2B of kernel 214-2. For example, vMEP 209-1B may initiate a loopback test and send a test signal 820. vMEP 209-2B may receive the test signal and return or loopback the test signal to vMEP 209-2A. vMEP 209-2A may identify any problems associated with the loopback test 820, such as whether vMEP 209-2B is not functioning properly, is not running based on lack of the return of the loopback test signal, etc. In this manner, each container 207 and/or kernel 214 may periodically exchange connectivity verification tests and/or perform loopback tests to verify the health/status of containers 207 and/or kernels 214 in the elastic platform virtualization service.

Figure 9:
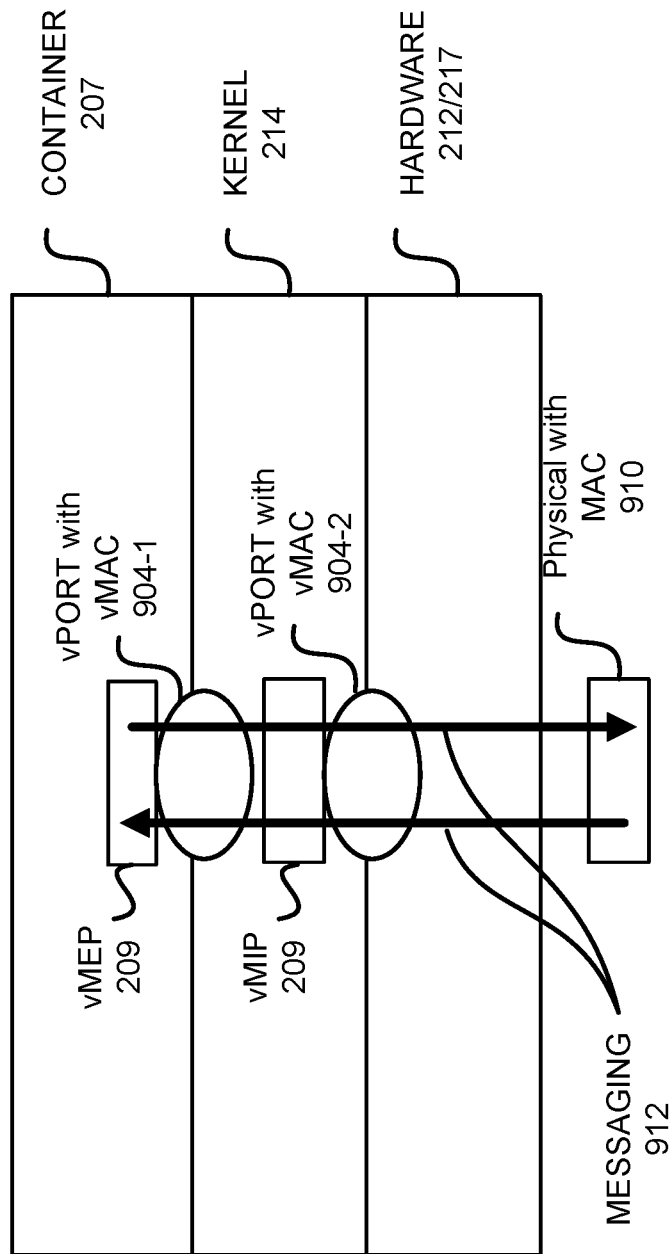
FIG. 9 is a diagram illustrating another exemplary SOAM testing associated with the elastic platform virtualization service.

According to another exemplary implementation, messaging may occur between vMEPs/vMIPs associated with container 207 and kernel 214. Referring to FIG. 9, vMEP 209 of container 207 and vMIP 209 of kernel 214 may exchange messaging 912 via interfaces, such as vPORT with virtual media access control (vMAC) 904-1 and vPORT with vMAC 904-2. The messaging 912 may include messages similar to those previously described in relation to FIG. 8 and elsewhere in this description, such as connectivity issues between container 207 and kernel 214, delay time, and so forth. The messaging 912 may traverse a physical with MAC layer 910.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising: determining, by a device, a first configuration for a virtualized device to be configured on the device, wherein the first configuration is based on three choices between using only a dedicated hardware and only a dedicated kernel; only a common hardware and only a common kernel; and a combination of the dedicated hardware, the dedicated kernel, conditional use of the common hardware, and conditional use of the common kernel; and creating, by the device based on the determining, the virtualized device, wherein the device determines the first configuration based on a health and type of a container associated with the virtualized device.

2. The method of claim 1, wherein the virtualized device includes the container that provides an application service based on the first configuration.

3. The method of claim 1, wherein the device determines the first configuration based on at least one of a category of application service or a type of traffic flow associated with the virtualized device.

4. The method of claim 1, further comprising:
monitoring, by the device, an operation of the virtualized device; and
determining, by the device based on the monitoring, whether the virtualized device is to be reconfigured.

5. The method of claim 1, wherein, when the first configuration includes using only the dedicated hardware and the dedicated kernel, the method further comprising:
storing, by the device, a usage threshold value that indicates at least one of a maximum utilization value or an average utilization value for the dedicated hardware;
identifying, by the device and based on the storing, that the at least one of the maximum utilization value or the average utilization value has been exceeded; and
reconfiguring, by the device in response to the identifying, the first configuration of the virtualized device, wherein a second configuration includes using the combination of the dedicated hardware, the dedicated kernel, the common hardware, and the common kernel.

6. The method of claim 5, wherein the second configuration includes a usage limit of the common hardware.

7. The method of claim 1, wherein the dedicated hardware and the common hardware each includes at least a processor, a memory, and a communication interface.

8. The method of claim 1, wherein the virtualized device includes an application programming interface to communicate system calls to the common kernel.

9. A device comprising: a processor configured to: determine a first configuration for a virtualized device to be configured on the device, wherein the first configuration is based on three choices between using only a dedicated hardware and only a dedicated kernel; only a common hardware and only a common kernel; and a combination of the dedicated hardware, the dedicated kernel, conditional use of the common hardware, and conditional use of the common kernel; and create, in response to the determination, the virtualized device, wherein the device determines the first configuration based on a health and type of a container associated with the virtualized device.

10. The device of claim 9, wherein the virtualized device includes the container that provides an application service based on the first configuration.

11. The device of claim 9, wherein the device determines the first configuration based on at least one of a category of application service or a type of traffic flow associated with the virtualized device.

12. The device of claim 9, wherein the processor is further configured to:
monitor an operation of the virtualized device; and
determine, based on the monitoring, whether the virtualized device is to be reconfigured.

13. The device of claim 9, wherein, when the first configuration includes using only the dedicated hardware and the dedicated kernel, the processor is further configured to:
store a usage threshold value that indicates at least one of a maximum utilization value or an average utilization value for the dedicated hardware;
identify, based on the storing, that the at least one of the maximum utilization value or the average utilization value has been exceeded; and
reconfigure, in response to the identification, the first configuration of the virtualized device, wherein a second configuration includes using the combination of the dedicated hardware, the dedicated kernel, the common hardware, and the common kernel.

14. The device of claim 13, wherein the second configuration includes a usage limit of the common hardware.

15. The device of claim 9, wherein the dedicated hardware and the common hardware each includes at least a processor, a memory, and a communication interface.

16. The device of claim 9, wherein the virtualized device includes an application programming interface to communicate system calls to the common kernel.

17. A non-transitory computer-readable storage medium storing instructions executable by a processor of a device, which when executed cause the device to: determine a first configuration for a virtualized device to be configured on the device, wherein the first configuration is based on three choices between using only a dedicated hardware and only a dedicated kernel; only a common hardware and only a common kernel; and a combination of the dedicated hardware, the dedicated kernel, conditional use of the common hardware, and conditional use of the common kernel; and create, in response to the determination, the virtualized device, wherein the device determines the first configuration based on a health and type of a container associated with the virtualized device.

18. The non-transitory computer-readable storage medium of claim 17, wherein the instructions further include instructions executable by the processor of the device, which when executed cause the device to:
monitor, during the providing, an operation of the virtualized device; and
determine, based on the monitoring, whether the virtualized device is to be reconfigured.

19. The non-transitory computer-readable storage medium of claim 17, wherein the dedicated hardware and the common hardware each includes at least a processor, a memory, and a communication interface.

20. The non-transitory computer-readable storage medium of claim 17, wherein the virtualized device includes an application programming interface to communicate system calls to the common kernel.

\* \* \* \* \*